United States Patent [19]

Basel et al.

[11] 3,976,277

[45] Aug. 24, 1976

[54] PINCH TUBE VALVE

[75] Inventors: Donald R. Basel, Garfield Heights; Raymond P. Kawolics, Solon, both of Ohio

[73] Assignee: Tomlinson Industries, Inc., Cleveland, Ohio

[22] Filed: Sept. 23, 1974

[21] Appl. No.: 508,208

[52] U.S. Cl. .................................. 251/7; 222/529; 251/144; 251/155
[51] Int. Cl.² ......................................... F16K 7/06
[58] Field of Search ............... 222/527, 529; 251/4, 251/155, 144; 239/546, 602; 137/801

[56] References Cited
UNITED STATES PATENTS

| 2,549,207 | 4/1951 | Kestenbaum | 251/7 X |
| 2,615,668 | 10/1952 | Ernest | 251/7 |
| 2,863,451 | 12/1958 | Barr et al. | 251/7 X |
| 3,078,501 | 2/1963 | Thorman | 251/8 X |
| 3,115,152 | 12/1963 | Goldberg et al. | 251/9 X |
| 3,435,752 | 4/1969 | Capstran | 137/360 X |
| 3,572,407 | 3/1971 | Delorme | 251/7 X |

FOREIGN PATENTS OR APPLICATIONS

| 1,317,101 | 12/1962 | France | 251/7 |

*Primary Examiner*—Martin P. Schwadron
*Assistant Examiner*—Richard Gerard
*Attorney, Agent, or Firm*—Fay & Sharpe

[57] ABSTRACT

A pinch tube type valve adapted to be mounted to a liquid container receiver to accept an elongated flexible outlet tube protruding from a liquid container disposed in the receiver for selective control of liquid flow through the tube from the container. The tube is passed through a passageway in the valve body for selective engagement by a stem which is reciprocable into and out of closing engagement therewith. The passageway is enlarged adjacent the inlet end of the valve body to permit easy insertion of the liquid container outlet tube therethrough. An apertured tube retaining area is disposed adjacent the outlet end of the valve body passageway to receive and retain the tube in a desired position relative to the container receiver to facilitate ease of liquid dispensing operations. The stem may also include a tube engaging protrusion arrangement when the valve is contemplated for use in pressurized liquid systems.

18 Claims, 8 Drawing Figures

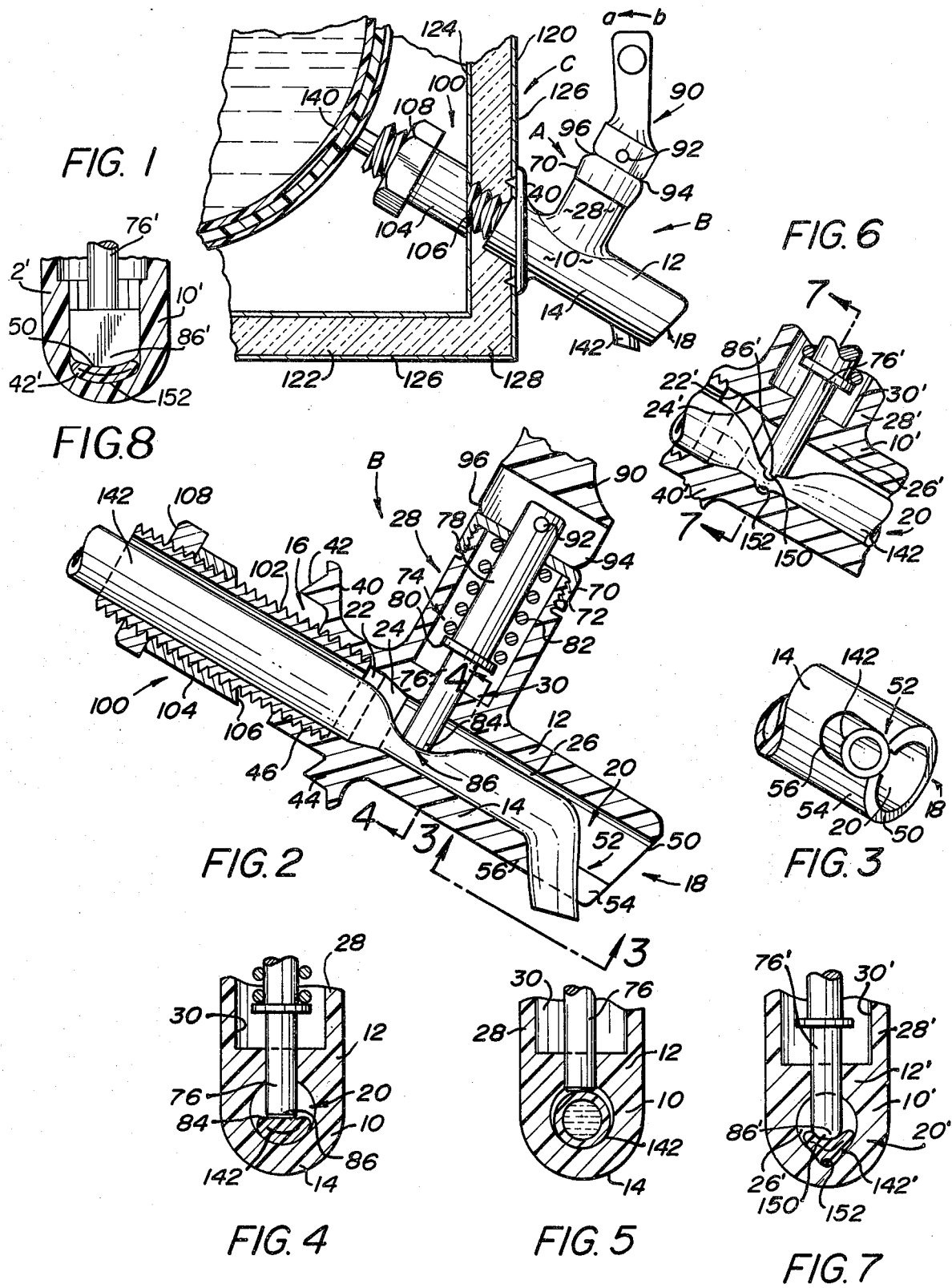

PINCH TUBE VALVE

BACKGROUND OF THE INVENTION

This invention pertains to the art of valves and more particularly to pinch tube type valves or faucets.

The invention is particularly applicable to dispensing liquids from containers having an elongated flexible outlet tube disposed at the bottom end thereof and will be described with particular reference thereto; however, it will be appreciated by those skilled in the art that the invention has broader applications and is equally applicable to any number of other liquid dispensing environments.

It has recently been found that it is extremely desirable to dispense certain liquids from a large liquid reservoir into smaller containers for use or consumption. A typical and merely exemplary specific environment of this situation is the case of serving wine in restaurants. It has been found that many persons would purchase wine during a meal if it was made available by the "glass" instead of only by the "bottle". In an effort to increase wine sales in this particular type of environment, a system has been devised whereby wine is dispensed from a reservoir arrangement and then sold by the glass. In this system, the wine is stored in flexible plastic bag-like containers which include an elongated flexible or pinch tube extending outwardly from the lowermost end thereof. A full bag or container is inserted into a chiller or cooler arrangement with the pinch tube passing outwardly therefrom through a valve arrangement in order that wine may be conveniently dispensed from the bag as needed. Although the problems and advantages which the subject invention recognizes and overcomes were first apparent in this particular environment, it will be appreciated that it is readily adapted to use in other environments for any type of liquid dispensing where it is desirable to employ a pinch tube dispensing arrangement.

Since in most pinch tube liquid dispensing arrangements of this general type liquid flows from the pinch tube by operation of gravity, it has heretofore been extremely difficult to determine the exact arc or flow characteristics of the liquid as it exits the outlet end of the pinch tube since they continuously vary dependent upon the head of liquid remaining in the liquid container. Although a number of pinch tube type valves have been previously developed and employed in similar environments, these prior valves have not solved the operational problems encountered in their use due to changes in the flow characteristics of the liquid issuing from the outermost end of the pinch tube. Normally, prior valves merely received and maintained the associated pinch tubes in "straight-line" configurations without any attendant consideration given to the angle of departure of liquid from the end of the tube. When this angle was any angle other than vertical, undesired liquid spillage occurred during liquid dispensing due to simple miscalculations as to the flow path or arc of the liquid stream. Such spillage is costly, from the standpoint of unrecoverable loss of liquid, as well as unsightly and messy from a housekeeping standpoint. This particular problem is further increased by the fact that prior pinch tube type valves have loosely held the outermost end of the tube so that it was easily moved or jarred to even further modify the liquid flow characteristics. Previous attempts at controlling the liquid flow path or arc by manipulating the location or direction of the pinch tubes has resulted in undesirable kinking and binding of the tubes which led to corresponding liquid flow restrictions. These very same problems are also found in pressurized liquid systems where pinch tubes and pinch tube type valves are utilized.

In the environment to which the subject invention is particularly adapted, the liquid containers are periodically replaced when they are emptied with new, full containers. This, of course, requires removal of the pinch tube associated with the empty container from the pinch tube valve and insertion of the pinch tube associated with the new full liquid container into association with the pinch tube valve. Normally, this requires "threading" the pinch tube along a narrow passage and has heretofore been made very difficult because of the length of the passageway and the close tolerances required between the outside diameter of the tube and the inside diameter of the passageway. These close tolerances were required primarily because of the specific operational nature of prior pinch tube type valves.

Another problem which has been previously encountered with prior pinch tube valves in pressurized liquid systems has been one of liquid leakage through the valves. Since the basic concept behind such valves is one of "pinching" closed an elongated flexible tube along a portion thereof to control liquid flow therethrough, it has been difficult to design an easily threadable valve in which there would not be some liquid leakage through the pinched off area.

BRIEF DESCRIPTION OF THE PRESENT INVENTION

The present invention contemplates a new and improved article which overcomes all of the above referred to problems and others and provides a new and improved pinch tube type valve which is simple in design, effective in both pressurized and unpressurized valving operations, economical to manufacture and readily adaptable to use in a wide range of liquid dispensing environments.

In accordance with the present invention, there is provided a new pinch tube type valve adapted to receive an elongated flexible tube for selective control of liquid through the tube. Accordingly, the valve includes a valve body having upper and lower surfaces, an inlet end, an outlet end, a first passageway interconnecting the inlet and outlet ends and a second passageway interconnecting the first passageway between the inlet and outlet ends thereof. Means for closing the valve are disposed in the second passageway, which means are selectively reciprocable in that passageway into and out of physical engagement with an elongated flexible tube disposed in the first passageway for controlling liquid flow through the tube. Tube retaining means are included in the lower surface of the valve body adjacent the outlet end to retain the outermost end of the tube in a particular desired position angularly disposed of the first passageway for dispensing liquid therefrom.

In accordance with another aspect of the present invention, the tube retaining means comprises an apertured area in the lower valve body surface communicating with the first passageway and extending longitudinally along a portion of the lower surface from the outlet end toward the inlet end. The apertured area closely receives a portion of the flexible tube adjacent the outermost end thereof.

In accordance with another aspect of the present invention, the closing means comprises a stem member selectively reciprocable within the second passageway into and out of the first passage. This stem has a first normal position extending into the first passageway to physically engage and pinch closed a flexible tube disposed therein and a second position wherein the stem is substantially withdrawn from the first passageway for allowing the tube to open.

In accordance with still a further aspect of the present invention, the stem includes a special tube engaging area and the first passageway includes a recess on the opposite side thereof from the area of communication between the first and second passageways. The tube engaging area of the stem forces a portion of the tube into the recess to more tightly close the tube when the stem is in the first position to facilitate use of the valve in pressurized liquid environments.

In accordance with yet another aspect of the present invention, an improvement for pinch tube valves is provided which improvement comprises tube retaining means disposed in the lower valve body surface adjacent the outlet end in order to retain the outermost end of the pinch tube in a particular desired position angularly disposed to the first passageway for dispensing liquid therefrom.

The principal object of the present invention is the provision of a new and improved pinch tube type valve which improves liquid dispensing operations through a pinch tube associated with the valve.

Another object of the present invention is the provision of a new and improved pinch tube type valve which is simple in design.

Still another object of the present invention is the provision of a new and improved pinch tube type valve which facilitates accurate guiding for stream of liquid issuing from a pinch tube associated with the valve.

Still another object of the present invention is the provision of a new and improved pinch tube type valve which facilitates ease of changing pinch tubes to be operatively associated with the valve.

Still a further object of the present invention is the provision of a new and improved pinch tube type valve which may be utilized in pressurized liquid systems.

Yet another object of the present invention is the provision of a new and improved pinch tube type valve which is readily adaptable for use in any number of liquid dispensing environments.

BRIEF DESCRIPTION OF THE FIGURES

The invention may take physical form in certain parts and arrangements of parts, a preferred embodiment of which will be described in detail in the specification and illustrated in the accompanying drawings which form a part hereof and wherein:

FIG. 1 is a side view of the subject new and improved pinch tube type valve shown in a typical contemplated liquid dispensing environment;

FIG. 2 is a cross-sectional view of the valve shown in FIG. 1;

FIG. 3 is a view taken along lines 3—3 in FIG. 2;

FIG. 4 is a cross-sectional view taken along lines 4—4 in FIG. 2 showing the valve in a closed condition;

FIG. 5 is a view identical with FIG. 4 except for showing the valve in an opened condition;

FIG. 6 shows a partial and cross-sectional view of an alternative valve arrangement adapted for particular use in pressurized liquid systems;

FIG. 7 is a cross-sectional view taken along lines 6—6 in FIG. 6; and,

FIG. 8 is a cross-sectional view similar to FIG. 7 showing another alternative structure employing guiding cooperation between the stem and valve body.

DESCRIPTION OF THE PREFERRED EMBODIMENT

Referring now to the drawings wherein the showings are for purposes of illustrating the preferred embodiment of the invention only, and not for purposes of limiting same, the FIGURES show the subject pinch tube valve as having a body portion A and a valve operating portion B with the valve itself being mounted in an exemplary operative association with a liquid chiller structure C.

More specifically, and with reference to FIGS. 1 and 2, body portion A is comprised of a valve body 10 having an upper surface 12, a lower surface 14, an inlet end 16 and an outlet end 18. Inlet and outlet ends 16, 18 are interconnected by a first passageway 20. This passageway has a first portion 22 extending inwardly from inlet end 16 and merging, through merger zone 24, into a second portion 26. The first portion has a greater cross-sectional dimension than the second portion and the relative sizes of both these portions to the outside diameter of a pinch tube will be described in greater detail hereinafter.

Valve operating portion B includes an operating portion housing 28 having a second passageway 30 passing therethrough and intersecting the first passageway. It should be particularly noted that in the preferred embodiment of the present invention, the second passageway is positioned generally normal to the first passageway. In addition, it should also be noted that the second passageway intersects second portion 26, that is, the smaller cross-sectioned portion of first passageway 20.

Disposed adjacent inlet end 16 is a mounting and locating flange 40. As will be noted in both FIGS. 1 and 2, this flange is mounted at an angle to the longitudinal axis of the first passageway to facilitate angular mounting of the valve which, in turn, facilitates ease of fluid flow by means of gravity through a pinch tube disposed in the first passageway. Although any number of mounting angles could be employed, the preferred embodiment of the invention contemplates an angle which will dispose the valve at approximately a 30° angle below the horizontal when the valve is mounted to a generally vertical mounting surface. Extending outwardly from the rear side of flange 40 are a pair of mounting protrusions 42, 44 which engage the mounting surface to prevent rotation of the valve once it has been closely installed on mounting surface. These protrusions are forced directly into a mounting surface as may be observed from the showings of FIG. 1. Extending inwardly along first portion 22 of first passageway 20 from inlet end 16 are internal threads 46. These threads are employed in receiving valve mounting and retaining means to be described in greater detail hereinbelow.

For asthetic purposes in hiding the pinch tube itself from view as well as for providing access to the tube for final location once it has been threaded through first passageway 20, front face 50 of outlet end 18 on the valve body is angled relative to the longitudinal axis of the first passageway. Although many angles may be satisfactorily utilized, the preferred embodiment of the present invention contemplates front face 50 being angled toward outlet end 18 from upper surface 12 toward lower surface 14 at an angle of approximately 45°.

Disposed in lower surface 14, extending from outlet end 18 toward inlet end 16 and communicating with the passageway 20 is an apertured tube retaining means generally designated 52. As best shown in FIGS. 2 and 3, this means is comprised of a slot-like aperture 54 which leads into a slightly larger, generally circular tube retaining portion 56. Of course, portion 56 could take other configurations without departing from the intent and scope of the present invention. In FIG. 2, it will be seen that the innermost end of this tube retaining portion is angled through lower surface 14 so that it is disposed at approximately the same angle as mounting and locating flange 40 relative to the longitudinal axis of passageway 20. The reasons for this particular arrangement will become readily apparent hereinafter in the description of operation of the valve. Slot-like aperture 54 has a width less than the outside diameter of an associated pinch tube and retaining portion 56 is approximately the same diameter as the outside diameter of that same pinch tube. Thus, the sides of a pinch tube may be squeezed together and then forcibly moved through the slot-like portion into the tube retaining portion and then retained in the tube retaining portion during liquid dispensing from the valve as will be described hereinafter.

Valve body 10 may be constructed from any convenient material as, for example, brass or plastic and in any convenient manner as, for example, by casting or molding. Since the valve structure itself is not directly 20, 30 to liquid pressures and merely acts as a housing for a pinch tube as well as means for selectively opening and closing the pinch tube to control liquid flow therefrom, it need not be constructed of a material having particularly high physical strength characteristics. For this reason, a molded plastic construction is preferred since it adds to reducing the cost of producing the valve. It is also contemplated that the valve body will take the specific physical appearance shown in the drawings where body 10 and operating portion housing 28 are generally cylindrical and where first and second passageways 20, 30 are also generally cylindrical. However, other configurations could also be satisfactorily employed without departing from the intent and scope of the present invention.

A bonnet 70 is threadedly received on the outermost end of operating portion housing 28 as at threads 72. An elongated stem member 74 is received in second passageway 30 and includes a pinch tube closing end 76 and an actuating end 78 separated by an outwardly extending flange 80. End 76 is selectively extensible into and out of first passageway 20 and end 78 extends outwardly of housing 28 through bonnet 70 which, in turn, acts as a guide for the stem. A coil spring 82 is received over end 78 and retained in a state of compression between flange 80 and the inside of bonnet 70 for purposes of exerting a continuous biasing force against flange 80 for urging the stem into the first passageway. In the preferred arrangement, at least pinch tube closing end 76 is contemplated as being generally cylindrical and includes a generous radius 84 at the outermost end thereof. It is this area as well as the outermost end 86 of the pinch tube closing end which actually engage the pinch tube when it is to be closed. It should be noted, however, that other configurations for ends 76, 86 could advantageously be employed without departing from the scope and intent of the present invention.

Disposed adjacent bonnet 70 is a valve actuating handle generally designated 90. This handle and stem 74 are interconnected at a pivot mounting 92 to permit relative rockable rotation therebetween. The handle also includes a first cam surface 94 adjacent the front side of the handle and a second cam surface 96 adjacent the rear side of the handle. Cam surface 94 comprises a gradual arcuate cam whereas cam surface 96 comprises a more abrupt arcuate cam. With the handle in the position shown in FIGS. 1 and 2, the valve is in what may be termed the first, normal or closed condition with the tube closing end 76 penetrating first passageway 20. Actuating handle 90 is arcuately movable or rockable about pivot mounting 92 in either of the directions $a$ or $b$ as shown in FIG. 1. Movement in either direction causes movement about one of cam surfaces 94, 96 to withdraw the stem from its full insertion into the first passageway back into the second passageway toward a second or opened position where the stem is substantially withdrawn from the first passageway. Because of the general sloping nature of cam surface 94, when handle 90 is moved in direction $b$ and then released, the biasing force provided by coil spring 82 forces the stem and handle back to the first, normal or closed position. However, because of the more abrupt design of cam surface 96, when the handle is moved in direction $a$, the handle and stem will be retained in an opened position even when the biasing pressure on the handle is released. This position then provides convenient means for permitting threading and unthreading of a pinch tube through the valve when it is required and/or desired. The specifics of the design and operation for handle 90 and cam surface 94, 96 are deemed known in the art and do not, in and of themselves, comprise a portion of the present invention. Other valve handle arrangements could also be used without departing from the scope and intent of the present invention.

For purposes of mounting the subject valve to a mounting surface, a mounting and retaining means generally designated 100 is advantageously provided. In this means, an elongated hollow threaded member 102 is provided which is conveniently threadedly received in internal threads 46. This member, as well as that portion of inlet end 16 spaced outboard of mounting and locating flange 40 are received through a hole provided in a surface to which the valve is to be mounted. Also provided is a spacer sleeve 104 having a front face 106 angled relative to the longitudinal axis of first passageway 20 at the same angle as mounting and locating flange 40. Finally, a tightening or jam nut 108 is threadedly received on threaded member 102 for closely drawing mounting and locating flange 40 against one side of a mounting surface and for forcing face 106 of spacer sleeve 104 against the other side of a mounting surface so that the valve may be rigidly mounted to that surface. Mounting protrusions 42, 44 penetrate the mounting surface during the installation and tightening process to prevent rotation of the valve relative to the mounting surface and retain the valve in the proper position.

In a typical and merely exemplary use environment contemplated for the subject valve, attention is invited to FIG. 1 which generally shows a liquid chiller C. The chiller includes side and bottom walls 120, 122 respectively with each wall having a thin inner wall 124 and a thin outer wall 126 with a conventional heat insulative material 128 disposed therebetween. The specifics of the chiller construction do not form a part of the present invention and, therefore, are not described in greater detail herein. In addition to the chiller structure just described, means are included to provide a heat sink for the chiller and thus cool or refrigerate the liquid contents disposed therein. Again, the valve of the subject invention may be used in any number of other liquid system dispensing environments. Operation of the valve itself, however, will be substantially identical in all such environments. It should be particularly appreciated, however, that use of the subject valve is not intended to be limited to the environment in which it is being described and that it is equally applicable to other dispensing environments employing other types of liquid containers or arrangements which include elongated pinch tubes for dispensing purposes.

In the specific type of environment in which the subject new and improved valve is being described, chiller C acts as a liquid container housing. It is contemplated that wine or other liquid will be placed in multi-ply plastic bags generally designated 140 in FIG. 1. Although any size of bag could be used depending upon the chiller size, one gallon volume bags are contemplated. Affixed to and extending outwardly from the lowermost portion of the bag is an elongated pinch tube 142. Although this tube could be manufactured from a number of materials, a resilient plastic tube is deemed to be particularly desirable. The length of the tube may vary; however, it is contemplated that the tube will be longer than required to extend from the chiller outwardly through the valve in order that it may be trimmed to the length required for a particular installation. Likewise, the outside diameter of pinch tube 142 may vary; however, it should be understood that this outside dimension is to be at least slightly smaller than the diameter of second portion 26 of first passageway 20.

In using the subject new and improved valve, bag 140 with its liquid contents is placed into chiller C and the pinch tube inserted into and through elongated hollow threaded member 102 to then pass into and along first passageway 20 and longitudinally outward of that passageway from outlet end 18. Of course, the outermost end of the pinch tube may initially be sealed or otherwise closed during this procedure to prevent undesired premature liquid flow therefrom. Also, valve handle 90 must be moved in either direction *a* or *b* to move end 76 of stem 74 from the first or closed position into the second or opened position fully withdrawn from the first passageway. Normally the handle is moved in direction *a* over cam surface 96 in order that the stem will be retained in the opened position. Since the stem is substantially withdrawn from the first passageway into the second passageway in its opened position and inasmuch as the diameters of passageway 20 are greater than the outside diameter of pinch tube 142, particularly first portion 22, threading of the tube through the valve is made quite simple. Once the tube has been threaded, it is then pinched, squeezed or temporarily deformed by hand in order that it may be forced along slot-like portion 54 of the tube retaining means 52 from outlet end 18 toward inlet end 16. As the tube enters retaining portion 56, the hand deformation pressure is released and the tube allowed to open. Since the diameter of tube retaining portion 56 is substantially the same as the outside diameter of the tube itself, the tube will fully open and then be retained in portion 56 until removed therefrom by the reverse process hereinabove just described.

Once threading of the tube has been completed, actuating handle 90 may again be moved so that pinch tube closing end 76 of stem 74 is returned to the first, normal or closed position so that it engages pinch tube 142 to pinch it closed as best shown in FIG. 4. With that, the outermost end of the pinch tube may be trimmed or otherwise opened in order that liquid may flow from container 140 through the pinch tube. Because of the overall valve design, the pinch tube is not kinked or crimped at this retaining area so that there are no restrictions to full liquid flow through the tube as had been the case in previous attempts of this general type as applied to pinch tube type valves. As will be noted in FIGS. 2 and 3, the outermost end of the pinch tube is positioned in retaining portion 56 generally parallel to mounting and locating flange 40. It is contemplated that in the preferred normal usage, the valve will be mounted to an approximately vertically disposed surface so that the outermost end of the pinch tube will also be vertically disposed. With this disposition, liquid issuing from the end of the pinch tube as the valve is opened will not stream or arc outwardly thereof and will, instead, take a substantially vertical path from the tube for easy and precise filling of a container, glass or the like. This arrangement thus overcomes the difficulty of having to judge or approximate a liquid flow path which normally has had the undesirable results of liquid loss due to inadvertent spillage with attendant housekeeping problems.

While particular reference to FIGS. 4 and 5, the specific location of the stem is shown for the first or valve closed and the second or valve opened positions. In FIG. 4, it will be seen that the outermost end 86 and radiused area 84 of pinch tube closing end 76 engage the pinch tube to force it into a closed condition. Again, second portion 26 of passageway 20 is of a greater diameter than pinch tube 142 to facilitate tube threading and pinch tube closing end 76 is of a lesser dimension than the pinch tube so that in the closed condition, the pinch tube is slightly bent upwardly around radiused area 84 into the closed condition. These dimensional relationships are deemed critical insofar as they insure complete "closing" of the pinch tube. That is, these dimension must be such that the outermost ends of the generally arcuate configuration of the area of the pinch tube which is closed are also completely closed. If the dimensional relationships are incorrect, some liquid leakage may undesirably occur at these outermost ends when the valve is in the closed condition. The pinch tube closing end is continuously biased into engagement with the pinch tube through the action of coil spring 82 and there is no positive stop for the stem except the pinch tube itself. This action thus compensates for slight normal variations occurring in the pinch tube diameter, pinch tube wall thickness and so on. When the valve is moved to the opened position as shown in FIG. 5, pinch tube closing end 76 is substantially withdrawn from second portion 26 of first passageway 20 into passageway 30 so that it will not interfere with threading and unthreading of the inch tube. Since the pinch tube is constructed of a resilient plastic material, the tube will automatically open to permit liquid flow therethrough as the valve stem is moved from the first toward the second position.

When the liquid contents of container 140 have all been dispensed, it is merely necessary to again pinch, squeeze or otherwise temporarily deform the pinch tube and force the outermost end thereof through slot-like portion 54 until it is again protruding generally longitudinally from outlet end 18. Thereafter, valve stem may be moved from the closed to the opened position and the pinch tube easily withdrawn from the passageway 20 in order that the liquid container may, in turn, be removed from liquid chiller C. Thereafter, a new, filled container may be placed in the chiller and the pinch tube threading process repeated as hereinabove described.

FIGS. 6 and 7 show a slight variation of the valve stem arrangement which may be particularly advantageous for use in pressurized liquid systems. For ease of illustration and since only the valve stem structure differs in this alternative embodiment, like primed (') numerals will be used for like components and new numerals are used for new components.

Accordingly, pinch tube closing end 76' of the valve stem includes a longitudinally outward extending tube engaging protrusion 150 from outermost end 86'. This protrusion is contemplated to have a thickness less than the diameter of closing end 76' while extending arcuately across substantially the entire diameter of that end. Other arrangments and configurations of protrusion 150 may also be used without departing from the intent and scope of the present invention as, for example, making the entire tube engaging portion 76' the same thickness as protrusion 150.

Oppositely disposed from protrusion 150, second portion 26 of first passageway 20 includes a protrusion receiving area 152. This area has the same general configuration as the protrusion itself but is slightly enlarged therefrom for reasons which will become apparent hereafter.

With this alternative arrangement and when the valve is in the first or closed position, protrusion 150 operates to force a portion of pinch tube 142' into receiving area 152. This action operates to assure both greater closure of the tube and increased resistance to liquid passing through the pinched off area. Because of the resilient nature of the tube, no permanent deformation thereof is experienced. This feature is particularly valuable when the valve is to be used in a pressurized liquid system where the liquid might otherwise be forced through the pinched off area to cause undesired liquid leakage.

In conjunction with this alternative embodiment and as shown in FIG. 8, it may also be desirable to extend the length of protrusion 150 and the configuration of receiving area 152 so that the receiving area extends transversely across the inside of the entire bottom surface 14' of second portion 26' and upwardly along the side walls thereof to both receive and guide the protrusion between the first and second positions. This feature eliminates unintentional rotational shifting of the stem relative to its preferred operative position which might otherwise affect operation of the valve.

With this last discussed feature, it is also possible to vary the overall physical design of at least pinch tube closing end 76'. This then may be used to compensate for variances in tube design and tube closing requirements encountered in different types of liquid dispensing systems and environments.

Again, the concepts of the subject invention are not limited to application in the specific liquid dispensing environment described and it should be understood that it is readily adapted to use in any number of liquid dispensing environments and pinch tube type containers or arrangements.

The invention has been described with reference to the preferred embodiment. Obviously, modifications and alterations will occur to others upon the reading and understanding of this specification. It is our intention to include all such modifications and alterations insofar as they come within the scope of the appended claims or the equivalents thereof.

Having thus described out invention, we now claim:

1. A pinch tube type valve adapted to receive an elongated flexible tube for selective control of liquid through said tube, said valve comprising:
   a valve body having upper and lower surfaces, an inlet end, an outlet end, a first passageway interconnecting said inlet and outlet ends and a second passageway communicating with said first passageway between said ends;
   means for closing said valve disposed in said second passageway, said closing means being selectively reciprocable within said second passageway into and out of engagement with said flexible tube in said first passageway for opening and closing said tube; and,
   tube retaining means comprising an apertured area in the lower surface communicating with said first passage and extending generally longitudinally along a portion of said lower surface from said outlet end toward said inlet end, said apertured area adapted to receive a portion of said tube adjacent the outermost end thereof for retaining said outermost end angularly disposed of said first passageway.

2. The valve as defined in claim 1 further including mounting means on said valve body for mounting said valve to a mounting surface in a desired position.

3. The valve as defined in claim 2 wherein said mounting means facilitates mounting said valve angularly of said mounting surface with said lower valve body surface forming an acute angle with said mounting surface.

4. The valve as defined in claim 1 wherein said apertured area is comprised of a slot-like portion extending inwardly along said bottom surface from said outlet end and opening into a tube retaining portion disposed at the innermost end of said slot-like portion, said slot-like portion having a width less than the cross-sectional dimension of said tube with said tube retaining portion having a cross-sectional dimension greater than the width of said slot-like portion.

5. The valve as defined in claim 4 wherein said retaining portion comprises an opening having a cross-sectional dimension approximately equal to the outside dimension of said tube.

6. The valve as defined in claim 4 wherein said retaining portion is angularly disposed through said valve body lower surface toward said inlet end.

7. The valve as defined in claim 1 wherein said first passageway has first and second cross-sectional dimensions, said first cross-sectional dimension extending from said inlet end to adjacent the inlet end side of the area of communication between said first and second passageways with the remainder of said first passage having said second cross-sectional dimension, said second cross-sectional dimension being greater than the cross-sectional dimension of said tube and less than said first cross-sectional dimension.

8. The valve as defined in claim 1 wherein said closing means comprises a stem member selectively reciprocable through said second passage within said first passage, said stem having a first normal position extending into said first passage and adapted to act against said tube to force said tube into a closed condition to prevent liquid flow therethrough, said stem having a second position withdrawn from engagement with said tube toward said second passage to allow liquid flow through said tube.

9. The valve as defined in claim 8 wherein said stem is continuously biased toward said first normal position and said second passage is disposed generally normal to said first passage.

10. The valve as defined in claim 9 wherein said stem includes a tube engaging portion having a cross-sectonal dimension slightly less than the diameter of said tube, said tube engaging portion having a generally flat outer end face generally normal to the longitudinal axis of said stem, said end face merging into said tube engaging portion at a radiused area extending circumferentially therearound.

11. The valve as defined in claim 8 wherein said stem includes a distinct tube engaging protrusion extending outwardly from the outermost end thereof cooperable with a distinct protrusion receiving area in the side wall of said first passageway opposite said second passageway whereby when said stem is in said first position said protrusion engages said tube to force a portion thereof at least slightly into said receiving area for more tightly closing said tube.

12. The valve as defined in claim 11 wherein at least said tube engaging protrusion and tube protrusion receiving area extend generally transversely across at least a portion of the diameter of said first passageway.

13. The valve as defined in claim 12 wherein said tube engaging protrusion and protrusion receiving area extend generally transversely across the entire diameter of said first passageway, said valve further including means for guiding said tube engaging protrusion in the desired orientation relative to said protrusion receiving area as said valve stem is selectively moved between said first and second positions.

14. In a pinch tube type valve for use in selectively controlling liquid flow through a flexible tube wherein the valve includes a valve body having an inlet end, an outlet end, a passageway connecting said inlet and outlet ends, an upper surface and a lower surface and wherein said flexible tube is adapted to be passed through said passageway with the outermost end thereof disposed adjacent said valve body outlet end, the improvement comprising:
tube retaining means comprising an apertured area in said lower surface communicating with said first passage and extending generally longitudinally along a portion of said lower surface from said outlet end toward said inlet end, said apertured area adapted to receive a portion of said tube adjacent the outermost end thereof for maintaining the outermost end of said tube angularly disposed of said first passageway.

15. The improvement as defined in claim 14 wherein said apertured area is comprised of a slot-like portion extending inwardly along said lower surface from said outlet end and opening into a tube retaining portion disposed at the innermost end of said slot-like portion, said slot-like portion having a width less than the cross-sectional dimension of said tube and said tube retaining means having a cross-sectional dimension greater than the width of said slot-like portion.

16. The improvement as defined in claim 15 wherein said retaining portion comprises an opening having a cross-sectional dimension approximately equal to the outside dimension of said tube.

17. A pinch tube type valve adapted to receive an elongated flexible tube for selective control of liquid through said tube, said valve comprising:
a valve body having upper and lower surfaces, an inlet end, an outlet end, a first passageway interconnecting said inlet and outlet ends and a second passageway communicating with said first passageway between said ends;
means for closing said valve disposed in said second passageway, said closing means being selectively reciprocable within said second passageway into and out of engagement with said flexible tube in said first passageway for opening and closing said tube;
tube retaining means in said lower surface communicating with said first passageway adapted to receive a portion of said tube adjacent the outermost end thereof for retaining said outermost end angularly disposed of said first passageway, said tube retaining means comprising an apertured area in said lower surface having a slot-like portion extending inwardly along said bottom surface from said outlet end and opening into a tube retaining portion disposed at the innermost end of said slot-like portion, said slot-like portion having a width less than the cross-sectional dimension of said tube with said tube retaining portion having a cross-sectional dimension greater than the width of said slot-like portion; and,
mounting means adapted to mount said valve angularly of a mounting surface with said lower valve body surface forming an acute angle with said mounting surface, said retaining portion of said apertured area being angularly disposed through said lower surface toward said inlet end at an angle such that when said valve is mounted to said mounting surface, the longitudinal axis of said retaining portion is generally parallel thereto.

18. In a pinch tube type valve for use in selectively controlling liquid flow through a flexible tube wherein the valve includes a valve body having an inlet end, an outlet end, a passageway connecting said inlet and outlet ends, an upper surface and a lower surface and wherein said flexible tube is adapted to be passed through said passageway with the outermost end thereof disposed adjacent said valve body outlet end, the improvement comprising:
tube retaining means in said lower surface communicating with said first passage adapted to receive a portion of said tube adjacent the outermost end thereof for retaining said outermost end in a particular desired position for dispensing liquid therefrom, said tube retaining means comprising an apertured area in said lower surface having a slot-like portion extending inwardly along said bottom surface from said outlet end and opening into a tube retaining portion disposed at the innermost end of said slot-like portion, said slot-like portion having a width less than the cross-sectional dimension of said tube with said tube retaining portion having a cross-sectional dimension greater than the width of said slot-like portion; and, means for mounting said valve to a mounting surface, at least said retaining portion passing through said lower surface at an angle such that the longitudinal axis of said tube retaining portion will be generally parallel to said mounting surface when said valve is affixed thereto.

* * * * *